(12) United States Patent  
Feinbloom et al.

(10) Patent No.: US 9,219,849 B2  
(45) Date of Patent: Dec. 22, 2015

(54) SYSTEM FOR CAMERA VIEWING AND ILLUMINATION ALIGNMENT

(71) Applicants: Richard E. Feinbloom, New York, NY (US); Kenneth Braganca, Sayville, NY (US); Roma Montifar, Elmhurst, NY (US)

(72) Inventors: Richard E. Feinbloom, New York, NY (US); Kenneth Braganca, Sayville, NY (US); Roma Montifar, Elmhurst, NY (US)

(73) Assignee: DESIGNS FOR VISION, INC., Ronkokama, NY (US)

( * ) Notice: Subject to any disclaimer, the term of this patent is extended or adjusted under 35 U.S.C. 154(b) by 181 days.

(21) Appl. No.: 14/087,322

(22) Filed: Nov. 22, 2013

(65) Prior Publication Data

US 2015/0146090 A1     May 28, 2015

(51) Int. Cl.  
*H04N 5/225*     (2006.01)

(52) U.S. Cl.  
CPC .......... *H04N 5/2252* (2013.01); *H04N 5/2256* (2013.01)

(58) Field of Classification Search  
CPC ... H04N 5/2252; H04N 5/2256; H04N 5/225; H04N 13/02; H04N 5/247; H04N 5/2251; H04N 21/4223; A61B 1/04–1/055  
See application file for complete search history.

(56) References Cited

U.S. PATENT DOCUMENTS

| | | | | |
|---|---|---|---|---|
| 3,893,145 | A * | 7/1975 | King | 396/422 |
| 4,021,824 | A * | 5/1977 | Uchiyama et al. | 396/167 |
| 4,025,933 | A * | 5/1977 | Berg | 396/190 |
| 4,081,814 | A * | 3/1978 | Bulland | 396/422 |
| 4,797,736 | A * | 1/1989 | Kloots et al. | 348/370 |
| 5,870,166 | A * | 2/1999 | Chang et al. | 351/158 |
| 6,224,227 | B1 * | 5/2001 | Klootz | 362/105 |
| 6,493,136 | B2 * | 12/2002 | Chang et al. | 359/399 |
| 6,854,902 | B2 * | 2/2005 | Marek | 396/425 |
| 7,645,050 | B2 * | 1/2010 | Wilt et al. | 362/103 |
| 8,068,169 | B2 * | 11/2011 | Chang | 348/375 |
| 8,289,443 | B2 * | 10/2012 | MacKenzie | 348/376 |
| 2010/0238270 | A1 * | 9/2010 | Bjelkhagen et al. | 348/45 |

* cited by examiner

*Primary Examiner* — Roberto Velez  
*Assistant Examiner* — Tuan Le  
(74) *Attorney, Agent, or Firm* — Law Office of Carl Giordano, PC

(57) ABSTRACT

A system for aligning a camera view and the illumination of a lighting fixture is disclosed. The system includes a camera contained with a housing and a lighting fixture that is pivotedly attached to the housing. An angle adjuster attached to a proximate end of each of the housing and the lighting fixture converts a linear movement to the adjuster into an angular adjustment of the lighting fixture with regard to an optical axis of a camera contained with the housing. In another aspect of the invention, the system of aligning a camera view and light fixture may be attached to a magnification lens in order to align the magnified view with the camera view and the illumination of the lighting fixture.

19 Claims, 3 Drawing Sheets

SYSTEM FOR CAMERA VIEWING AND ILLUMINATION ALIGNMENT

BACKGROUND

1. Field of the Invention

The present application relates to the field of optical magnification devices and more particularly to a system for alignment of a camera viewed with magnification devices with a light source.

2. Background

Video cameras continue to become smaller and more useful in recording events as they occur. In the field of surgery, for example, doctors use video recording to record operations for subsequent viewing by students, for learning purposes, and insurance companies, for malpractice avoidance.

Generally, the video cameras that are used are mounted to the doctor's head or glasses to provide a view of what the doctor is seeing. In addition, a light may also be attached to the video camera in order to light the area in which the user is viewing.

However, when the doctor is performing microsurgery or dental surgery, magnification devices are typically employed. These magnification devices generally limit the doctor's view to a very small area. In this case, any misalignment of the doctor's optical view, the camera's optical view or projected light can cause video recording of an area that is not being viewed by the doctor or not lighting the doctor's viewing area.

Thus, the benefits achieved by the video recording may be negated.

Hence, there is a need in the industry for a system and method of providing and maintaining precise alignment of the optical viewing angles of the doctor and the video recording device.

SUMMARY

It is the object of the present invention to provide a system for providing and maintaining a precise alignment of a camera's view and an intended lighted area.

It is another object of the present invention to maintain a fixed positional relationship between a video recorder optical view and a lighted area.

In one embodiment of the invention, an apparatus disclosed that provides alignment between a camera and a light, the apparatus comprising a housing containing a camera therein, said camera having a known focal length, said housing comprising a first cavity and a second cavity at a proximate end of said housing, wherein a passage is formed between said first cavity and said second cavity; a light fixture pivotedly attached to said housing at a substantially distal end of each of the housing and the light fixture; and an adjustment mechanism comprising: a vertical follower, pivotedly attached to a proximate end of said light fixture, said vertical follower including a threaded passage therethrough, said threaded passage having a known pitch; a retaining nut, contained in said first cavity, said retaining nut including an internal thread of said known pitch, a compression spring having a first end in contact with a closed end of said second cavity and a bottom surface of said vertical follower; and a lead screw, extending through said vertical follower, said compression spring and said passage to said retaining nut, said lead screw having a thread matching said internal thread.

BRIEF DESCRIPTION OF THE DRAWINGS

For a better understanding of exemplary embodiments and to show how the same may be carried into effect, reference is made to the accompanying drawings. It is stressed that the particulars shown are by way of example only and for purposes of illustrative discussion of the preferred embodiments of the present disclosure, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. In the accompanying drawings.

It is noted that the drawings of the invention are not to scale. The drawings are intended to depict only typical aspects of the invention, and therefore should not be considered as limiting the scope of the invention. In the drawings, like numbers represent like elements between the drawings.

It is to be understood that the figures and descriptions of the present invention described herein have been simplified to illustrate the elements that are relevant for a clear understanding of the present invention, while eliminating, for purposes of clarity many other elements. However, because these omitted elements are well-known in the art, and because they do not facilitate a better understanding of the present invention, a discussion of such element is not provided herein. The disclosure herein is directed to also variations and modifications known to those skilled in the art.

DETAILED DESCRIPTION OF THE INVENTION

Figure 1:
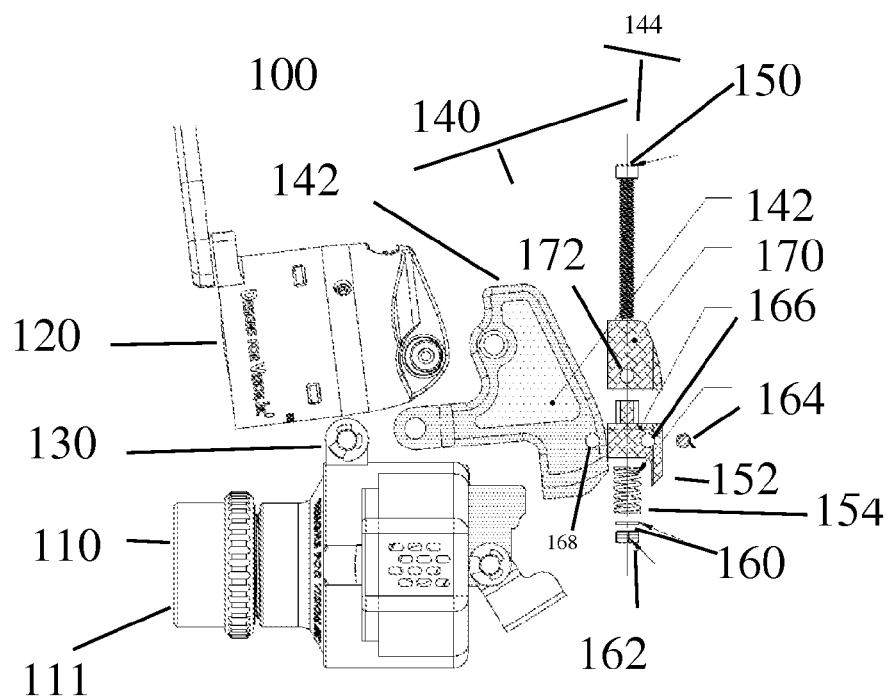
FIG. 1 illustrates an exploded cross section view of an alignment mechanism according to an aspect of the invention.

Referring to FIG. 1, there is shown a cross sectional view of an unassembled device 100 in accordance with the principles of the invention.

FIG. 1, illustrates a camera/light combination device 100 comprising a camera housing 110 (including a camera 111, therein, and a light assembly 120. Also shown is a pivot mechanism 130 attached to a substantially distal end of each of the light assembly 120 and the camera housing 110. Pivot mechanism 130 allows for a change in angle between the camera housing 110 and the light 120. Further illustrated is an alignment mechanism 140 that controls and retains a set angle between camera housing 110 and light 120, such that the illumination provided by light 120 is maintained at a desired point (e.g., the focal point of camera 111).

Alignment mechanism 140 includes a housing 142 and an adjustment mechanism 144. Housing 142 engages pivot mechanism 130 attached to camera housing 110. Housing 142 rotates about pivot mechanism 130 in order to vary or change the angle of light 120 relative to a reference line (e.g., an optical axis of camera 111). Thus, alignment means 140 controls the orientation of light 120 with respect to camera 110.

Adjustment mechanism 144 is pivotedly attached to housing 142. Adjustment mechanism 144 controls and maintains the orientation of housing 142, and consequently, the orientation of light 120 with respect to camera housing 110.

Adjustment mechanism 144 includes a lead screw 150, a vertical follower 152, a vertical follower cover 170 and spring 154, wherein vertical flower 152 and vertical follower cover 170 includes a passage (not shown) to allow insertion of lead screw 150. Lead screw 150 enables linear actuation of the threaded vertical follower 152 in a vertical direction. Vertical follower 152 is threaded such that vertical follower 152 moves vertically along the lead screw 150 and, consequently, vary an angle of the light 120 with respect to the orientation of the camera housing 110. Spring 154 retains rigidity of the adjustment mechanism 144 by providing vertical pressure on a bottom face of vertical follower 152 (see FIG. 4).

Also shown are washer 160 and nut 162. Washer 160 minimizes surface wear between nut 162 and camera housing 110. Nut 162 captures lead screw 150 and allows for the turning of lead screw 150, which causes vertical movement of vertical follower 152 (and cover 172).

Also shown is attachment (dowel) pin 164 that attaches the adjustment mechanism 144 to housing 142 through recess 168 in housing 142 and recess 166 in vertical follower 152. Vertical follower cover 170 is attached to vertical follower 152) through set screw 172. Vertical follower cover 170, thus, moves vertically as vertical follower 152 moves along lead screw 150.

Dowel pin 164 enables vertical follower 152 to pivot in order to retain a substantially vertical position relative to housing 142 as lead screw 150 is adjusted (i.e., turned) and orientation of light fixture 120 with camera housing 110 changes.

Figure 2:
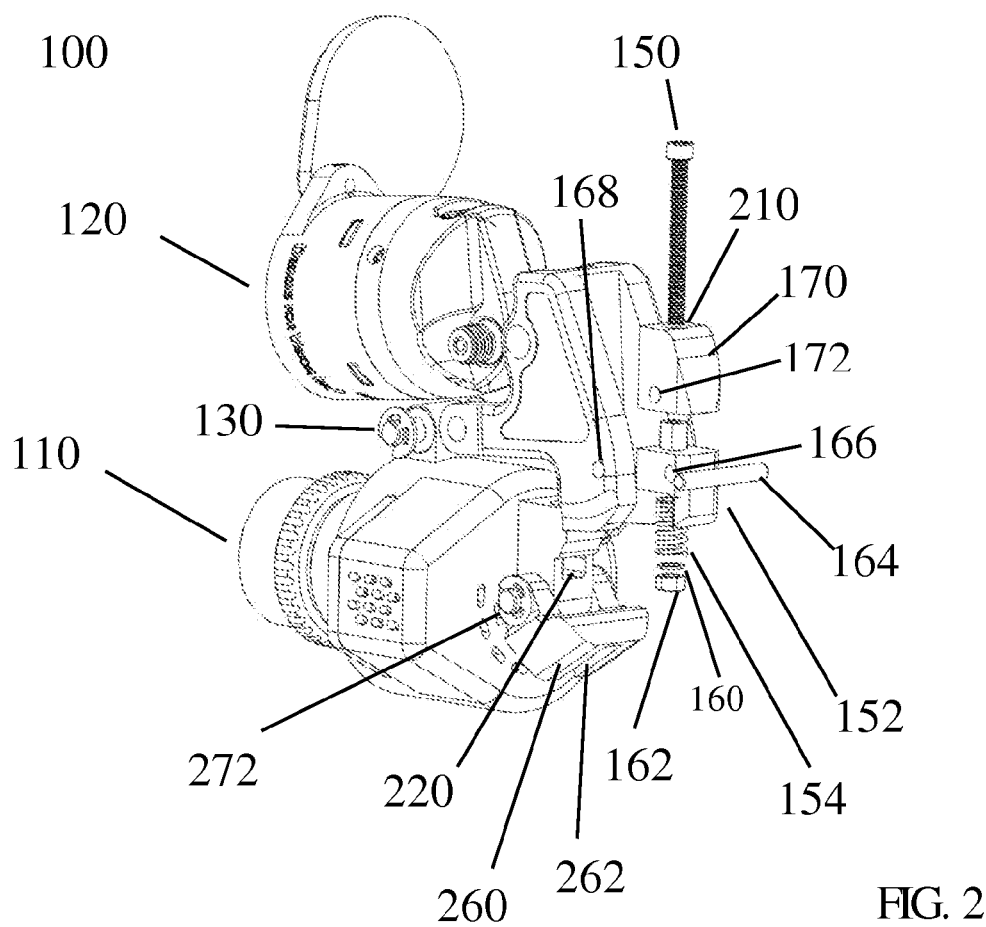
FIG. 2 illustrates a prospective assembled view of the device illustrated in FIG. 1.

FIG. 2 illustrates a prospective view of the camera/light assembly 100 in accordance with the principles of the invention.

Also shown is an exploded view of the attachment of pivot point 130 with housing 142 and an exploded view of alignment mechanism 140.

Also shown is a passage 210 in vertical follower cover 170 and vertical follower 152 through which lead screw 150 passes. Also shown is spring 154 and nut 162 through which lead screw 150 passes. Spring 154 engage a bottom surface of vertical follower 152.

Also shown is cavity 220 in camera housing 110. Cavity 220 captures and retains nut 162 within camera housing 110.

Figures 3A, 3B:
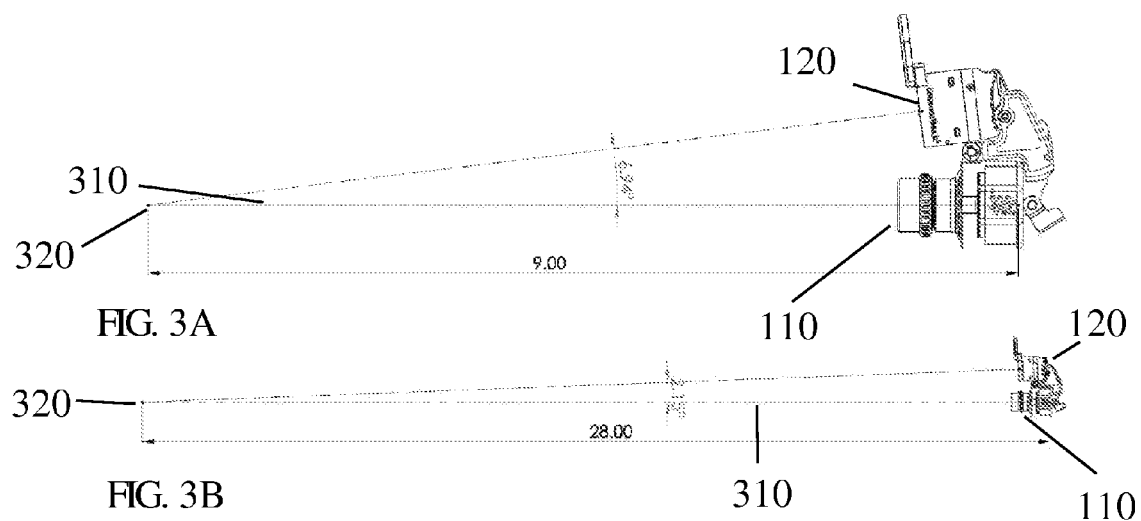
FIGS. 3A and 3B illustrate exemplary angular offsets according to an aspect of the invention.

FIGS. 3A and 3B illustrate angular orientation of the light 120 with regard to the optical axis of camera 110 at two different distances (e.g., the focal points 320); 9 inches and 28 inches.

In this illustrative embodiment, the angular orientation of light 120 with respect to the optical axis of camera 110 varies from 6.9 degrees at 9 inches to 2.15 degrees at 28 inches. The vertical and substantially linear motion of lead screw 150 causes an angular (and non-linear) motion of light 120 with respect to optical axis 310 of camera 111.

As would be appreciated, the angular orientation of light 120 with respect to the optical axis of camera 111, at one or more distances from the camera housing 110, is also based on a distance between a center point of the optical axis 310 of the camera 111 and a center point of light projection of light 120. Hence, the range (i.e., 9-28 inches) discussed herein is solely to illustrate a range (distance) and present the subject matter claimed as the invention. Thus, changes in the height of the vertical follower 152, which rides on the lead screw 150, adjusts the angle of the light 120 relative to the optical axis 310 of the camera 111, such that a substantially maximum illumination is presented at the focal point of camera 111.

Thus, in accordance with the principles of the invention, the angular orientation between light 120 and camera 111 may be set, and retained, at a specific angle that is based on a specific distance from the camera lens.

Figure 4:
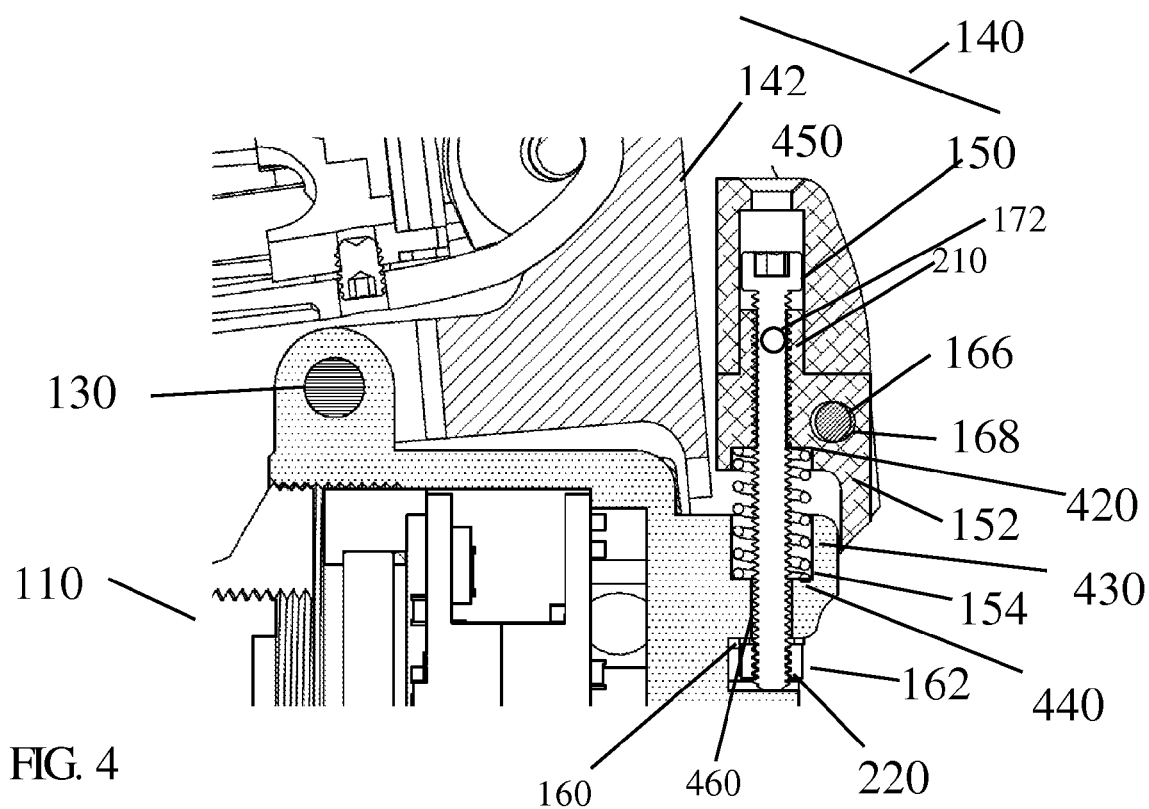
FIG. 4 is a cross-sectional, assembled view of the device illustrated in FIG. 3.

FIG. 4 illustrates an detailed cross-sectional view of the alignment mechanism 140 showing lead screw 150 engaging nut 162 and being retained by compression spring 154 between a bottom surface 420 of vertical follower 152 and camera housing 110. Also shown is housing 142, which pivots about pivot point 130, as lead screw 150 engages nut 162 and vertical follower 152 travels vertically along lead screw 150.

Further illustrated is cavity 220 in camera housing 110 retaining nut 162, which retains lead screw in a desired position. Cavity 220 allows lead screw 150 to turn but not advance in its position with regard to nut 162.

Also shown is a second cavity 430 in camera housing 110. Second cavity 430, which is substantially perpendicular to the first cavity 220, captures spring 154 to retain spring 154 in tension between a surface of camera housing 110 (e.g., surface 440 of second cavity 430) and bottom surface 420 of vertical follower 152.

Also shown is passage 460 through camera housing 110 that connects second cavity 430 with first cavity 220. Passage 460 allows lead screw 150 to connect to nut 162 in first cavity 220. Passage 460 may in one aspect of the invention be threaded. In another aspect of the invention, passage 460 may be smooth to allow lead screw 150 to pass through to engage number 162.

Also shown is screw head 450, which is used to adjust the adjustment mechanism by turning lead screw 150. Screw head may be one of a slotted, Phillips, hex, knurled, etc., which allows turning of lead screw 150.

As would be appreciated the incremental change in orientation of housing 142 about pivot point 130 is determined based at least on a tread sizing (i.e., treads per inch) and the length of lead screw 150. For example, using a treading sizing 80 treads per inch a quarter-turn of the lead screw 150 may result in an incremental distance change in the order of one-half (½) inch. Note, that the incremental distance change is a non-linear function of the rotation of the lead screw 150. Thus, at a close range or distance (e.g., 9 inches) a one-quarter turn rotation of lead screw 150 results in change of distance that is different than a similar one-quarter turn rotation of lead screw 150 at a further distance. (e.g., 28 inches). Hence, said pitch of lead screw is determined based on a desired rate of angular change of the light 120 with regard to a rotational change of the lead screw 150.

The sizing of lead screw 150 at 80 threads per inch is merely an example, and it would be recognized that other thread sizing may be incorporated without altering the scope of the invention.

Returning to FIG. 2, there is also shown a second attachment means 260. In this illustrated case, the second attachment means 260 includes a slotted or "T" attachment 262 that may be used to attach or mate with an external "T" (not shown). Attachment means 260 may be used to attach the completed device 100 to a second device (not shown). For example, device 100 may be attached to the bridge of eyeglasses using second attachment means 260. Or device 100 may be attached to a head set (or head band) using second attachment means 260.

In addition, second attachment means 260 may be fixedly attached to a proximate end of the housing 110. Alternatively, the second attachment means 260 may be pivotedly attached to housing 110 (as shown in FIG. 2).

In an alternative embodiment, the second attachment means may represent a screw type mechanism that may include a screw and a fixed surface. The screw retains device 100 in place by the screw applying pressure to a bridge of an eyeglass captured between the screw and the fixed surface.

The invention has been described with reference to specific embodiments. One of ordinary skill in the art, however, appreciates that various modifications and changes can be made without departing from the scope of the invention as set forth in the claims. Accordingly, the specification is to be regarded in an illustrative manner, rather than with a restrictive view, and all such modifications are intended to be included within the scope of the invention.

Benefits, other advantages, and solutions to problems have been described above with regard to specific embodiments. The benefits, advantages, and solutions to problems, and any element(s) that may cause any benefits, advantages, or solutions to occur or become more pronounced, are not to be construed as a critical, required, or an essential feature or element of any or all of the claims.

As used herein, the terms "comprises", "comprising", "includes", "including", "has", "having", or any other variation thereof, are intended to cover non-exclusive inclusions. For example, a process, method, article or apparatus that comprises a list of elements is not necessarily limited to only those elements but may include other elements not expressly listed or inherent to such process, method, article, or apparatus. In addition, unless expressly stated to the contrary, the term "of" refers to an inclusive "or" and not to an exclusive "or". For example, a condition A or B is satisfied by any one of the following: A is true (or present) and B is false (or not present); A is false (or not present) and B is true (or present); and both A and B are true (or present).

The terms "a" or "an" as used herein are to describe elements and components of the invention. This is done for convenience to the reader and to provide a general sense of the invention. The use of these terms in the description herein should be read and understood to include one or at least one. In addition, the singular also includes the plural unless indicated to the contrary. For example, reference to a composition containing "a compound" includes one or more compounds. As used in this specification and the appended claims, the term "or" is generally employed in its sense including "and/or" unless the content clearly dictates otherwise.

All numeric values are herein assumed to be modified by the term "about," whether or not explicitly indicated. The term "about" generally refers to a range of numbers that one of skill in the art would consider equivalent to the recited value (i.e., having the same function or result). In any instances, the terms "about" may include numbers that are rounded (or lowered) to the nearest significant figure.

It is expressly intended that all combinations of those elements that perform substantially the same function in substantially the same way to achieve the same results are within the scope of the invention. Substitutions of elements from one described embodiment to another are also fully intended and contemplated.

What is claimed is:

1. An apparatus comprising:
    a housing containing a camera therein, said camera having a known focal length, said housing comprising a first cavity and a second cavity at a proximate end of said housing, wherein a passage is formed between said first cavity and said second cavity;
    a light fixture pivotedly attached to said housing; and
    an adjustment mechanism comprising:
        a vertical follower, pivotedly attached to said light fixture, said vertical follower including a threaded passage therethrough, said threaded passage having a known pitch;
        a retaining nut, contained in said first cavity, said retaining nut including an internal thread of said known pitch,
        a compression spring having a first end in contact with a closed end of said second cavity and a bottom surface of said vertical follower; and
        a lead screw, extending through said vertical follower, said compression spring and said passage to said retaining nut, said lead screw having a thread matching said internal thread.

2. The apparatus of claim 1 further comprising:
    a vertical follower cover attached to said vertical follower, said cover having a passage allowing said lead screw to pass therethrough.

3. The apparatus of claim 1, wherein said known pitch is determined based on a desired angular change of said light fixture with respect to said housing.

4. The apparatus of claim 1, wherein a range of angular orientation of the light fixture with regard to said housing is based on a length of said lead screw.

5. The apparatus of claim 1, further comprising:
    a second attachment mechanism located at said proximate end of said housing.

6. The apparatus of claim 5 wherein said second attachment mechanism is pivotedly attached to said housing.

7. The apparatus of claim 5, wherein said second attachment mechanism is fixedly attached to said housing.

8. The apparatus of claim 7, wherein said second attachment mechanism comprises: a screw mechanism.

9. The apparatus of claim 1, wherein said light fixture is pivotally attached to said housing at a substantially distal end of the housing.

10. An eyeglass comprising:
    a bridge connecting a first lens and a second lens, and
    a visual recording device attached to said bridge, said visual recording device comprising:
        a housing containing a camera therein, said camera having a known focal length, said housing comprising a first cavity and a second cavity at a proximate end of said housing, and a passage between said first cavity and said second cavity;
        a light fixture pivotedly attached to;
        an adjustment mechanism comprising:
            a vertical follower, pivotedly attached to said light fixture, said vertical follower including a threaded passage therethrough, said threaded passage having a known pitch;
            a retaining nut, contained in said first cavity, said retaining nut including an internal thread of said known pitch,
            a compression spring having a first end in contact with a closed end of said second cavity and a bottom surface of said vertical follower; and
            a lead screw, extending through said vertical follower, said compression spring and said passage to said retaining nut, said lead screw having a thread matching said internal thread; and
        a second attachment mechanism attached to a proximate end of said housing connecting said bridge and said visual recording device.

11. The apparatus of claim 10 wherein said second attachment mechanism is pivotedly attached to said housing.

12. The apparatus of claim 10, wherein said second attachment mechanism is fixedly attached to said housing.

13. The apparatus of claim 10, wherein said second attachment mechanism comprises: a screw mechanism.

14. The apparatus of claim 10, wherein said second attachment mechanism comprises of one: a T mount and a slot mount.

15. A headband assembly comprising:
a headband, and
a visual recording device attached to said bridge, said visual recording device comprising:
- a housing containing a camera therein, said camera having a known focal length, said housing comprising a first cavity and a second cavity at a proximate end of said housing, and a passage between said first cavity and said second cavity;
- a light fixture pivotedly attached to said housing;
- an adjustment mechanism comprising:
  - a vertical follower, pivotedly attached to said light fixture, said vertical follower including a threaded passage therethrough, said threaded passage having a known pitch;
  - a retaining nut, contained in said first cavity, said retaining nut including an internal thread of said known pitch,
  - a compression spring having a first end in contact with a closed end of said second cavity and a bottom surface of said vertical follower; and
  - a lead screw, extending through said vertical follower, said compression spring and said passage to said retaining nut, said lead screw having a thread matching said internal thread; and
- a second attachment mechanism attached to a proximate end of said housing connecting said bridge and said visual recording device.

16. The headband assembly of claim 15 wherein said second attachment mechanism is pivotedly attached to said housing.

17. The headband assembly of claim 15, wherein said second attachment mechanism is fixedly attached to said housing.

18. The headband assembly of claim 15, wherein said second attachment mechanism comprises: a screw mechanism.

19. The headband assembly of claim 15, wherein said second attachment mechanism comprises of one: a T mount and a slot mount.

* * * * *